Oct. 23, 1956  R. F. HEINJE  2,767,866
LATERALLY ADJUSTABLE HITCH FOR BALER
Filed Nov. 7, 1952  2 Sheets-Sheet 1
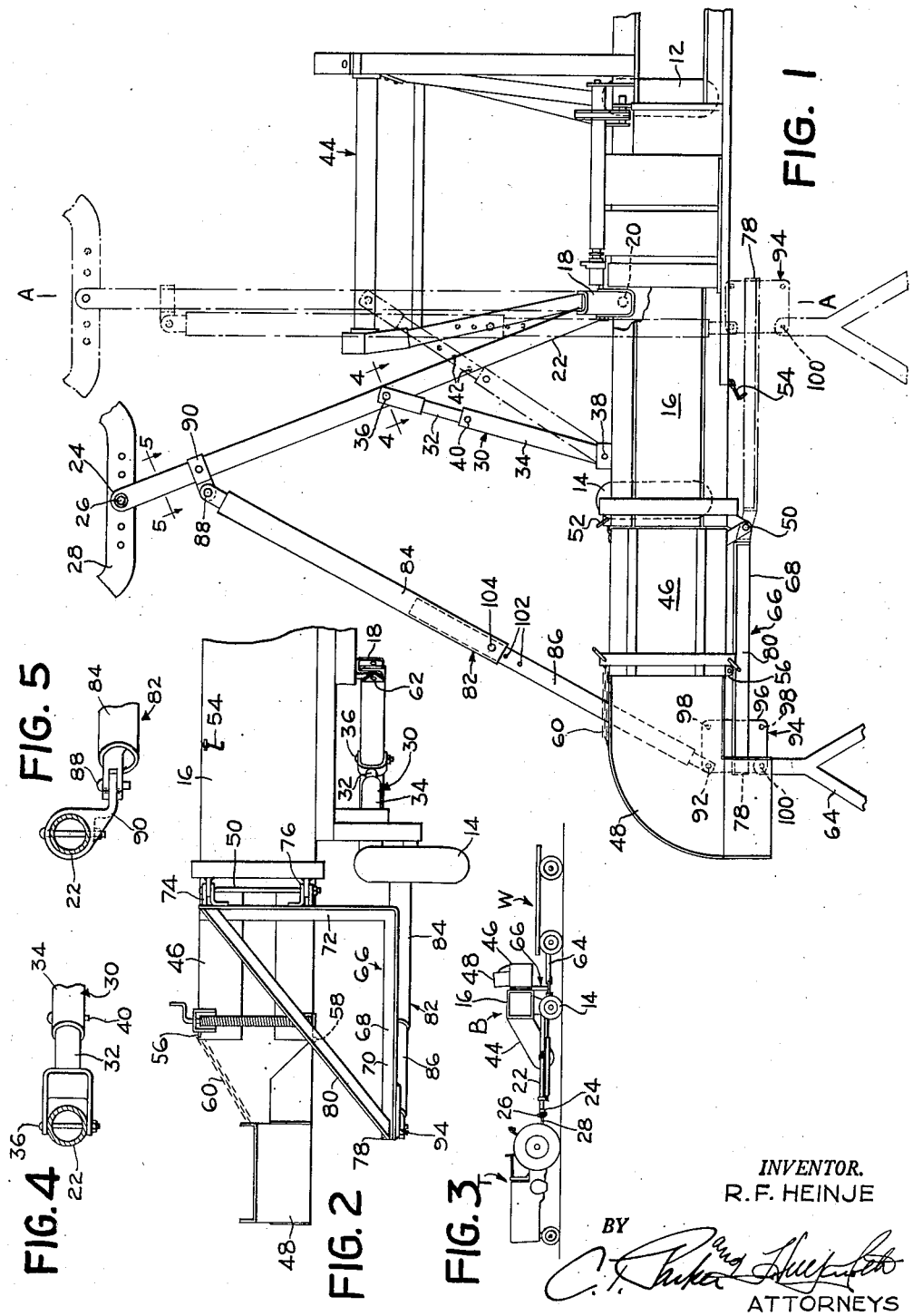
INVENTOR.
R. F. HEINJE
BY
ATTORNEYS Oct. 23, 1956 R. F. HEINJE 2,767,866
LATERALLY ADJUSTABLE HITCH FOR BALER
Filed Nov. 7, 1952 2 Sheets-Sheet 2
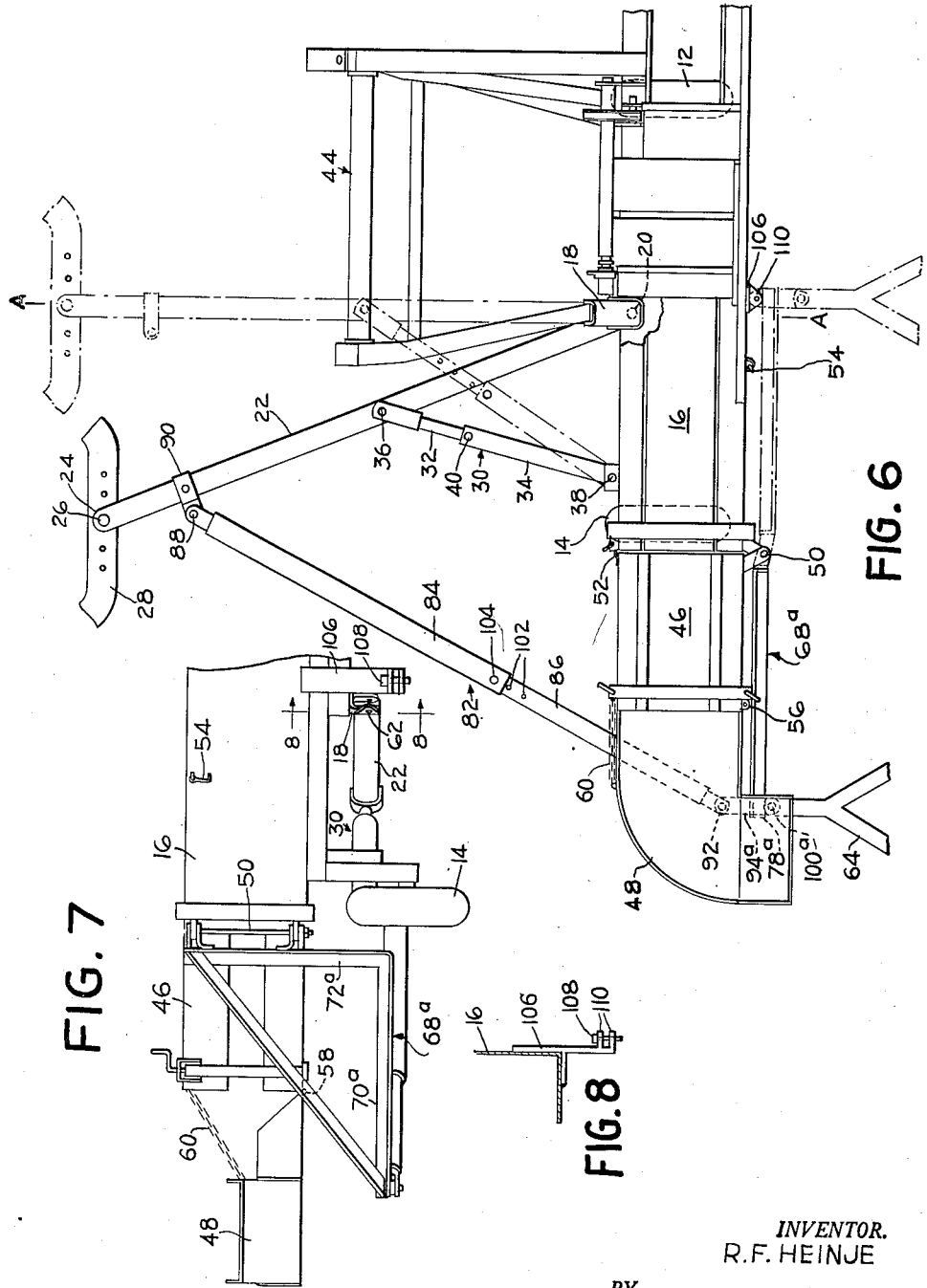
INVENTOR.
R.F. HEINJE
ATTORNEYS United States Patent Office 2,767,866
Patented Oct. 23, 1956

2,767,866

LATERALLY ADJUSTABLE HITCH FOR BALER

Robert F. Heinje, Ottumwa, Iowa, assignor to Deere Manufacturing Co., Dubuque, Iowa, a corporation of Iowa Application November 7, 1952, Serial No. 319,329

7 Claims. (Cl. 214—42)

This invention relates to a trailer hitch and more particularly to an improved trailer hitch for connecting a trailer to an agricultural machine.

A typical agricultural machine in which the invention finds substantial utility is the mobile pick-up baler of the type having a bale case disposed transversely to the line of travel and presenting a discharge end laterally spaced outwardly at one side of the machine. Such a baler comprises a main frame carried on a pair of wheels transversely spaced apart substantially equal distances from each side of the longitudinal center line of the baler. A pick-up mechanism extends forwardly from the right-hand side of the machine to gather hay or straw from the field. The pick-up mechanism delivers the hay or straw to the bale case in which a reciprocating plunger operates along a line transverse to the line of advance for forming bales in the bale case. When each bale attains its proper size, it is tied and a subsequent bale forces the previously formed and tied bale out the left-hand end of the bale case. In some instances, the bales are discharged directly to the ground and are picked up subsequently by a bale loader or manually. The trend recently is to equip the discharge end of the baler with means for preventing the discharge of the bales directly to the ground, guiding them instead into a position in which they may be readily received by a trailer towed by the baler directly behind the discharge end. It will be appreciated from the foregoing that a baler of this character has a substantially wide operating dimension, which is in fact so great as to make it impossible to transport the machine along narrow roads and through gates of standard widths. Accordingly, it has heretofore been appreciated that a desirable expedient is means for folding part of the bale case back upon itself so that the baler is not appreciably wider than the tread of the wheels. This idea has been supplemented by a swinging draft tongue, which when the baler is transported occupies a position extending directly ahead of and substantially on the longitudinal center line of the baler and which when the machine is operated has its forward end positionable in offset relationship to the center line so as to lie substantially directly ahead of the discharge end of the bale case. Consequently, when a tractor draws the baler in the field, the tractor is offset to the left of the windrow and the tractor wheels do not run over the windrow before it is picked up by the pick-up mechanism.

Because of the aforesaid trend in hitching a trailer directly behind the baler to receive bales from the discharge end of the bale case, various types of hitches have been provided, some of them makeshift affairs that are perfectly satisfactory while the baler is operating but which present no little difficulty when it is desired to transport the baler, since the hitch must be dismantled in order to permit the desired decrease in width of the baler. Another problem that arises in transporting the baler is that it is desirable to tow the trailer directly behind the baler. Obviously, the baler cannot be towed in its offset position, since to do so would defeat the entire purpose of narrowing the width of the machine for transport. Accordingly, it is desirable to tow the trailer directly behind the baler so that the tractor, baler and trailer are directly in line.

The principal object of the present invention is to provide a novel hitch structure which accommodates the position of the trailer either directly behind the discharge end of the baler or directly behind the baler in transport position, in which latter position the trailer will substantially track on the longitudinal center line of the machine.

Other objects of the invention reside in the provision of novel structure whereby the trailer hitch may be selectively positioned in either an extended position or a folded position. In its extended position, it extends laterally at the discharge end of the baler; in its folded position, it lies alongside or rearwardly of the bale case. Still another object of the invention is to incorporate in the hitch structure means for retaining the hitch in either of its positions.

The invention has for a further feature a telescopic brace that may be rigidified to retain the hitch in its extended position and which is releasable to telescope so as to accommodate changes in length of the brace means as the hitch is moved to its folded position. A still further feature of the invention is to utilize a hitch of the general character referred to in a baler or other machine having a swingable draft tongue capable of occupying either a transport position or an operating position as referred to generally above.

It is also an object of the invention to provide a hitch structure in one or more forms that may be readily attached to machines of existing design and consequently which may be furnished to owners of machines of that character as an auxiliary hitch or attachment device.

The foregoing and other important objects and desirable features inherent in and encompassed by the invention will become apparent as a detailed description of two preferred embodiments of the invention progresses in the following detailed description and accompanying sheets of drawings in which:

Figure 1 is a plan view of a typical baler of the character referred to, showing in full lines the operating position of the baler hitch and the trailer hitch and indicating in dotted lines the transport positions of the parts.

Figure 2 is a fragmentary rear elevational view of the left-hand side of the trailer as equipped with one form of the hitch means.

Figure 3 is a side elevational view on a scale considerably reduced over that of Figures 1 and 2 and showing the tractor, baler and trailer as they appear in transport position.

Figure 4 is a sectional view, on an enlarged scale, as seen substantially along the line 4—4 of Figure 1.

Figure 5 is a sectional view on the scale of Figure 4 as seen substantially along the line 5—5 of Figure 1.

Figure 6 is a view similar to Figure 5 but showing a different form of the invention.

Figure 7 is a view similar to Figure 2 but showing the form of the invention illustrated in Figure 6.

Figure 8 is a fragmentary sectional view as seen along the line 8—8 of Figure 7.

*Figures 1 through 5*

The baler chosen for purposes of illustration may be taken as representative of an agricultural machine adapted to advance over a field and having means for discharging material at one end thereof. In the present instance, the baler is rendered mobile for advance over a field by a pair of transversely spaced apart wheels 12 and 14 on which is carried suitable framework including a bale case 16 arranged transversely to the line of advance. The wheels 12 and 14 are substantially equidistantly spaced apart from the longitudinal center line of the machine, represented here by the line A—A in Figure 1. The forward part of the bale case 16 includes a bracket 18 having a pivot 20 on a vertical axis substantially on the center line A—A. This bracket 18 provides for the attachment of the rear end of a forwardly extending draft tongue 22, the front end of which is provided with a clevis 24 and connecting pin 26 for connection to a drawbar 28, for example, of a tractor or similar propelling vehicle. The tractor is illustrated in Figure 3 and is designated by the letter T. The baler is designated in its entirety by the letter B in Figure 3 and, in the same figure, the letter W represents a conventional four-wheel trailer or flat-bed wagon.

The full-line position of the draft tongue 22 in Figure 1 represents its operating position, which is characterized principally in that the point of draft connection at 24—26—28 is offset to the left of the pivotal connection 20. Stated otherwise, the draft connection is offset to the left of the longitudinal center line A—A of the baler. A telescopic brace 30 has front and rear parts 32 and 34 connected respectively at 36 and 38 to an intermediate portion of the tongue 22 and to a portion of the front part of the bale case 16 adjacent to the left-hand wheel 14. Releasable connecting means, such as a pin 40, selectively cooperative with any one of a plurality of holes 42, enables the brace 30 to be selectively rigidified or relaxed, hence permitting the draft tongue 22 to be selectively positioned as shown in full lines or as shown in dotted lines. The brace 30 is, of course, retracted and locked in its full-line position for operating the baler. The brace is extended and locked for holding the draft tongue 22 in the dotted-line position when the baler is to be transported.

The baler includes at the right-hand side thereof and extending ahead of the right-hand wheel 12 a pick-up mechanism designated generally by the numeral 44. Familiarity with the details of construction and operation of pick-up mechanisms of this character will be assumed and further description will be omitted. Suffice it to say that the pickup operates in the usual manner to pick up hay or straw from the field and to deliver it rearwardly to the right-hand end of the bale case 16. As is conventional, the bale case contains a reciprocating plunger (not shown here) for forming the material into bales and ultimately discharging the bales toward the left, through a bale case extension 46 and onto discharge means, here comprising a bale chute 48. It will be understood, of course, that the left-hand end of the bale case extension 46 is open so that the bales may emerge from that end and slide to the left onto the chute 48. It is a characteristic of the baler of the type just described that the discharge means 48 is laterally offset to the left of the left-hand wheel 14. Stated otherwise, the discharge end is remote from the longitudinal center line A—A.

A typical patent showing the particular arrangement of the swinging draft tongue is assignee's patent to Hill 2,499,500. A representative bailer-trailer organization is disclosed in the patent to Heinje 2,634,675.

It has been previously stated that an expedient usable in narrowing the width of the baler for transport is the folding bale case extension. In the present instance, folding of the extension 46 relative to the bale case 16 would occur about a vertical pivot axis accomplished by an upright elongated pivot pin 50. Subject matter of this character is of no patentable importance in the present case, being covered in assignee's copending application Serial No. 218,194, filed March 29, 1951, now Patent No. 2,672,807. For present purposes, it should suffice to note that the bale case extension 46 is locked in its operating position as shown in Figure 1 by means of suitable latches, such as represented by the numeral 52.

When the latches 52 are released, the extension 46 may be swung to a position so that it lies rearwardly of the bale case 16 as suggested in Figure 3, in which position it is locked by suitable means including a hook 54 on the back wall of the bale case and an apertured ear 56 on the discharge end of the extension 46. It will be further noted from a comparison of Figures 2 and 3 that the discharge means or chute 48 is pivoted to the floor of the extension 46 on a longitudinal pivot axis accomplished by a pin 58. One or more chains 60 may be utilized to support the chute or tailboard 48 in the position of Figures 1 and 2. In the transport position of the tractor-baler-trailer organization, the chute or tailboard 48 is hinged upwardly about the pivot 58 and is retained in that position by any suitable means, not important here.

As a further expedient in transporting the baler, which expedient is also conventional, the entire baler tilts upwardly and rearwardly about the rolling axis of the wheels 12 and 14. For this purpose, the bracket 18 that connects the tongue 22 to the baler includes a pivot 62 on a transverse axis, so that the bracket 18 is substantially in the form of a universal joint, including the vertical axis 20 as well as the transverse axis 62. When the baler is tilted upwardly (Figure 3), the front end of the pick-up 44 raises so that the draft tongue may swing under it (dotted-line position in Figure 1). The details of this part of the structure are disclosed in the Hill patent identified above and per se form no part of the present invention.

Tailboards or chutes of the character of that shown here at 48 were previously used to guide the discharging bales to the ground so that the bales would lie along a line parallel to the line of advance. These bales were subsequently picked up, either manually or by a mechanical loader. As outlined generally above, the present trend is to extend the tailboard rearwardly in the form of a chute so that the bales may be immediately loaded on a trailer, such as represented by the trailer or wagon W in Figure 3. It is therefore necessary to provide some form of hitch for towing the trailer in offset relation to the baler so that the trailer trails directly behind the discharge means or chute 48. Such a trailer will have a forwardly extending tongue 64 and will be otherwise conventional. The trailer hitch shown in the form of the invention under discussion is designated generally by the numeral 66 and comprises the components to be set out below.

A principal part of the hitch is a transverse hitch element 68, here in the form of an L having a transverse leg 70 and an upright leg 72. The leg 72 has thereon means for affixing or attaching the element 68 to the bale case 16 on a vertical pivot offset to the left or toward the discharge means 48 from the longitudinal center line A—A of the machine. In the present instance, the pivot includes the upright pivot pin 50 for the bale case extension 46. It will be understood, of course, that a separate pivot could be provided. That shown here is merely representative of a design in which advantage is taken of existing structure. To this end, then, the upright member 72 has thereon a pair of apertured ears 74 and 76 through which the pivot pin or rod 50 is passed. The ears 74 and 76 are spaced sufficiently far apart vertically as to afford suitable support for the hitch element 68, which is thus in the form of a cantilever. The pivot 50 is so located and the length of the leg 70 is such that the outer or free end 78 of the leg 70 is capable of occupying either of two positions. Because of the hinge or pivot at 50, the element 68 may be swung from an extended position as shown in Figure 2 and as shown in full lines in Figure 1 to a folded or retracted position as shown in dotted lines in Figure 1. When the element 68 is in its extended position, the free or outer end 78 thereof is substantially directly in fore-and-aft alinement with the discharge means or chute 48. When the element 68 is in its folded position, the free or outer end 78 thereof is substantially centered on the longitudinal center line A—A of the baler. The element is braced by a downwardly and outwardly extending brace bar 80 for imparting the necessary rigidity to the element.

The element 68 is braced or rigidified in its extended position by releasable means designated generally by the numeral 82. In this form of the invention, this means is in the form of a brace comprising first and second relatively movable parts 84 and 86. The first part 84 is articulately connected by a vertical pivot pin 88 to an appropriate bracket 90 rigid on a forward part of the tongue 22. The rear end of the second member or part 86 is pivotally connected at 92 to the free or outer end of the element 68. In a preferred design, the element 68 is provided at its outer end 78 with means designated generally by the numeral 94 and serving as composite means for effecting connection of the trailer tongue 64 as well as connection of the brace means 82. The means 94 comprises a plate 96 having therein a plurality of apertures 98. One of these apertures receives a connecting pin 100 for articulately connecting the front end of the trailer tongue 64 to the plate. Another of the apertures receives the pin 92 for connecting the second part 86 of the brace means 82.

A preferred design of the brace means 82 utilizes the first and second parts 84 and 86 in telescopic relation. Here, the part 84 is tubular and receives the approximate end portion of the second part 86. The parts are appropriately apertured, such as suggested in Figure 1 at 102, to receive a cooperative pin 104, all of which establishes releasable or disconnectible means that are connectible to rigidify the brace means 82 and that are disconnectible or releasable to permit relative movement between the parts 84 and 86.

It is a feature of this form of the invention that the brace means 82 when disconnected from the hitch element 68 may be folded alongside of the draft tongue 22 of the baler. For this purpose, the bracket 90 is preferably offset below the general level of the tongue 22 (Figure 5) so that the brace means 92 may be swung below the tongue brace means 30.

It will also be noted that the connection of the brace means 82 to the tongue at 88—90 is considerably ahead of the left-hand wheel 14 and that when the brace 82 is in its full-line position as shown in Figure 1, the brace lies to the left or outwardly of the left-hand wheel 14. Additionally, the brace 82 lies at a level below the top of the left-hand wheel 14. As will be obvious from the dotted-line position of the parts in Figure 1, the brace 82 must swing inwardly and pass the wheel 14 in order to occupy its folded position alongside the tongue 22. This result may be accomplished in either one of two ways on the basis of the structure disclosed.

According to one method, the baler may be arranged for transport by releasing the bale case extension latch 52 and pivoting the bale case extension 46 into transport position behind the bale case 16, utilizing the hook 54 and apertured ear 56 to retain the bale case extension in that position. The tailboard or discharge means 48 will, of course, be swung to its hinged position as shown in Figure 3. The trailer tongue 64 is disconnected from the means 94 on the hitch element 68 and the pin 92 between the means 94 and the rear part 86 of the brace means 82 may now be removed, whereupon the hitch element 68 may be swung to the dotted-line position of Figure 1. Next, the pin 104 may be removed from its locking position between the brace means parts 84 and 86 and the part 86 may be telescoped into the part 84. It will be observed that the length of the part 84 is such that its free end will easily clear the front of the wheel 14. The part 86 may be telescoped into the part 84 sufficiently so that the free end of the part 86 will also clear the wheel 14. After the brace means has been swung to the right of the wheel 14, it may be extended and the rear end of the part 86 reconnected to the means 94. The pin 104 may be replaced in an appropriate aperture 102, again rigidifying the brace. Thus, the brace serves as a means for locking the hitch element 68 in its folded position, as well as means for retaining the hitch element 68 in its operating or extended position. Stated otherwise, the means 94 on the hitch element 68 serves, in the folded position of the hitch element, as means for supporting the folded brace means 82.

The trailer tongue 64 may be reconnected by the pin 100 to the means 94 and the trailer will thus trail directly behind the tractor and baler.

If desired, the foregoing result may be accomplished by disconnecting the brace means 82 entirely or even by dismantling it and reassembling it in its dotted-line position. In the first method described, advantage is taken of the structure to clear the wheel 14 so that preparation of the baler for transport becomes a relatively simple matter.

The plurality of apertures 98 in the plate 96 affords a choice of connection of both the rear end of the brace 82 and the forward end of the trailer tongue 64. The plate could, of course, be provided with additional apertures for further selective connection of the parts. Such modifications are deemed to be within the spirit and scope of the present invention.

*Figures 6, 7 and 8*

To the extent that the structures in Figures 1 through 5 and in Figures 6 through 7 are the same, identical reference characters will be used. Primarily, uniformity will be observed as to baler components. Since the hitch element 68 of the design of Figures 1 through 5 is slightly different from that to be presently described, the latter will be identified by the numeral 68a. However, it will be noted that the basic structure of the two is the same and that the element 68a has a horizontal leg 70a and a vertical leg 72a pivoted on the pivot axis 50, just as in the case of the element 68.

Since there is no fundamental difference between the brace means 82 in Figure 1 and that in Figure 6, the latter will be identified by the numeral 82. The details of the two may be assumed to be the same and what has been said relative to the brace means 82 as described above will apply also to the brace means 82 of Figure 6. The reference characters 84, 86, 88, 90, 102 and 104 will be applied to the brace means 82 in Figure 6 for the purposes of convenience. Likewise, it will be assumed that the rear part 86 of the brace means 82 in Figure 6 includes a connecting pin such as that designated at 92 in Figure 1.

One of the differences between the hitch elements 68 and 68a is that the attaching means for the element 68a is different from the means 94 on the element 68. The means on the element 68a will be here designated generally by the numeral 94a. This means has a pair of fore-and-aft spaced apart apertures for receiving the pin 92 as well as a pin 100a for connecting the front end of the trailer draft tongue 64 to the free or outer end 78a of the element 68a.

In this form of the invention, the brace means 82 is not utilized to retain the hitch element 68a in its folded position. Instead, the rear part of the bale case 16 is provided with a member 106 that forms part of means for locking or retaining the hitch element 68a in its folded position. When the trailer-connecting pin 100a is removed from the means 94a and the pin 92 is also removed from the means 94a, the hitch element 68a may be swung to its folded position, whereupon the rear part of the means 94a now becomes a forward part and alines itself with the member 106 just described. A pin 108 is dropped through the apertured ears 110 at the bottom of the member 106 and through the aperture just vacated by the trailer-connecting pin 100a. If desired, the removed pin 92 may be used for this purpose. The trailer tongue 64 may be reconnected to the forward aperture in the means 94a, utilizing the pin 100a or some other pin if desired. In any event, the trailer, as in Figures 1 through 5, is connected to the baler so as to track directly behind the machine.

When the draft tongue 22 in Figure 6 is swung to its dotted-line position, the user has his choice of leaving the brace 82 thereon or of removing it completely. If he desires to leave it in place, connected at its forward end by the pin 88, he may remove the pin 104 and telescope the part 86 into the part 84. When the brace means 82 is swung to a folded position (not shown), its rear end may be supported in any suitable manner. Or, as suggested, the brace means may be entirely removed and carried on the trailer or on some appropriate part of the baler.

In any case, the fundamental identity between the two forms of the invention remains: The means for connecting the trailer to the hitch element 68 or 68a is common to both positions of either element and this means further serves as an expedient to lock the element 68 or 68a in its folded position, as well as serving as means for connection to the brace 82 for rigidifying the element 68 or 68a in its extended position. Likewise, in either case, the trailer in operating position is towed behind the discharge end of the baler substantially in fore-and-aft alinement with the discharge means or chute 48.

Summary

Various specific features and aspects of the invention not particularly enumerated herein will undoubtedly occur to those versed in the art, as likewise will many changes and modifications of the preferred forms of the invention illustrated, all of which may be achieved without departing from the spirit and scope of the invention.

What is claimed is:

1. In an agricultural material-handling machine carried by wheel means for advance over a field and including means for discharging material in a discharge zone spaced laterally outwardly from the fore-and aft centerline of the machine, the improvement residing in a trailer hitch comprising: a hitch element having first and second opposite ends and means thereon at said first end for attachment thereof to the machine on a pivot substantially midway between the aforesaid centerline and discharge means and rearwardly of the wheel means for swinging of said element optionally between a laterally outwardly extended position and a laterally inwardly projecting folded position, said pivot being so located and said element being of such length that in its extended position it extends laterally outwardly from said pivot to dispose its second end adjacent to the discharge means and in its folded position it projects laterally inwardly from said pivot to dispose said second end substantially on the aforesaid centerline and rearwardly of the wheel means, said element in both positions lying at a level below the top of the wheel means; means on said second end of the element for receiving the tongue of a trailer in either position of the element; brace means extending generally fore-and-aft and pivoted at its front end to the machine ahead of the wheel means for swinging from a storage position at the centerline side of the wheel means to a bracing position at the discharge means side of the wheel means, said brace including first and second relatively movable parts, the first of which is connected to the machine at the aforesaid pivot ahead of the wheel means and the second of which is connectible to the second end of the element in either position of said element, said first part being shorter than the distance between the wheel means and the pivot ahead of the wheel means so that said first part may swing past the front of the wheel between storage and bracing positions, the second part being disconnectible from the first part to enable said first part to move as aforesaid; and releasable means cooperative to interconnect the parts against relative movement in both the storage and bracing positions of the brace means for holding the hitch element against displacement relative to the machine selectively in both its folded and extended positions.

2. In an agricultural material-handling machine carried by wheel means for advance over a field and including means for discharging material in a discharge zone spaced laterally outwardly from the fore-and-aft centerline of the machine, the improvement residing in a trailer hitch comprising: a hitch element having first and second opposite ends and means thereon at said first end for attachment thereof to the machine on a pivot substantially midway between the aforesaid centerline and discharge means and rearwardly of the wheel means for swinging of said element optionally between a laterally outwardly extended position and a laterally inwardly projecting folded position, said pivot being so located and said element being of such length that in its extended position it extends laterally outwardly from said pivot to dispose its second end adjacent to the discharge means and in its folded position it projects laterally inwardly from said pivot to dispose said second end substantially on the aforesaid centerline and rearwardly of the wheel means, said element in both positions lying at a level below the top of the wheel means; means on said second end of the element for receiving the tongue of a trailer in either position of the element; brace means extending generally fore and aft and pivoted at its front end to the machine ahead of the wheel means for swinging from a storage position at the centerline side of the wheel means to a bracing position at the discharge means side of the wheel means, said brace including first and second relatively telescopic parts, the first of which is connected to the machine at the aforesaid pivot ahead of the wheel means and the second of which is connectible to the second end of the element in either position of said element, said first part being shorter than the distance between the wheel means and the pivot ahead of the wheel means and said second part being detachable from the element and capable of being telescopic relative to the first part to such extent as to enable the brace means to swing past the front of the wheel between storage and bracing positions and releasable means cooperative to interconnect the parts against relative movement in the storage and bracing positions of the brace means for holding the hitch element against displacement relative to the machine selectively in both its folded and extended positions.

3. In an agricultural material-handling machine carried by wheel means for advance over a field and including means for discharging material in a discharge zone spaced laterally outwardly from the fore-and-aft centerline of the machine, the improvement residing in a trailer hitch comprising: a hitch element having first and second opposite ends and means thereon at said first end for attachment thereof to the machine on a pivot substantially midway between the aforesaid centerline and discharge means and rearwardly of the wheel means for swinging of said element optionally between a laterally outwardly extended position and a laterally inwardly projecting folded position, said pivot being so located and said element being of such length that in its extended position it extends laterally outwardly from said pivot to dispose its second end adjacent to the discharge means and in its folded position it projects laterally inwardly from said pivot to dispose said second end substantially on the aforesaid centerline and rearwardly of the wheel means, said element in both positions lying at a level below the top of the wheel means; means on said second end of the element for receiving the tongue of a trailer in either position of the element; brace means extending generally fore and aft and pivoted at its front end to the machine ahead of the wheel means for swinging from a storage position at the centerline side of the wheel means to a bracing position at the discharge means side of the wheel means, said brace including first and second relatively movable parts, the first of which is connected to the machine at the aforesaid pivot ahead of the wheel means and the second of which is connectible to the second end of the element in either position of said element, said first part being shorter than the distance between the wheel means and pivot ahead of the wheel means so that said first part may swing past the front of the wheel between storage and bracing positions, the second part being disconnectible from the first part to enable said first part to move as aforesaid; releasable means cooperative to interconnect the parts against relative movement in the bracing position of the brace means for holding the hitch element against displacement relative to the machine in its extended position; and means for releasably retaining the element in its folded position.

4. In an agricultural material-handling machine carried by wheel means for advance over a field and including means for discharging material in a discharge zone spaced laterally outwardly from the fore-and-aft centerline of the machine, the improvement residing in a trailer hitch comprising: a hitch element having first and second opposite ends and means thereon at said first end for attachment thereof to the machine on a pivot substantially midway between the aforesaid centerline and discharge means and rearwardly of the wheel means for swinging of said element optionally between a laterally outwardly extended position and a laterally inwardly projecting folded position, said pivot being so located and said element being of such length that in its extended position it extends laterally outwardly from said pivot to dispose its second end adjacent to the discharge means and in its folded position it projects laterally inwardly from said pivot to dispose said second end substantially on the aforesaid centerline and rearwardly of the wheel means, said element in both positions lying at a level below the top of the wheel means; means on said second end of the element for receiving the tongue of a trailer in either position of the element; brace means extending generally fore and aft and pivoted at its front end to the machine ahead of the wheel means for swinging from a storage position at the centerline side of the wheel means to a bracing position at the discharge means side of the wheel means, said brace including first and second relatively telescopic parts, the first of which is connected to the machine at the aforesaid pivot ahead of the wheel means and the second of which is connectible to the second end of the element in either position of said element, said first part being shorter than the distance between the wheel means and pivot ahead of the wheel means so that said first part may swing past the front of the wheel between storage and bracing positions, the second part being disconnectible from the first part to enable said first part to move as aforesaid; releasable means cooperative to interconnect the parts against relative movement in the bracing position of the brace means for holding the hitch element against displacement relative to the machine in its extended position; and means for releasably retaining the element in its folded position.

5. In an agricultural baler adapted to advance over the field on a pair of wheels transversely spaced part at opposite sides of the fore-and-aft centerline of the baler and including bale-discharge means laterally beyond one wheel and a forwardly extending pivoted draft tongue selectively positionable in a transport position with its front end substantially on said centerline or an operating position with its front end forwardly of and substantially in fore-and-aft alinement with the bale-discharge means, the improvement residing in a trailer hitch comprising: a hitch element having first and second opposite ends and means on its first end for attachment to the baler on a pivot behind the wheels and substantially midway between the aforesaid centerline and the bale-discharge means for swinging of said element between a folded position in which its second end is substantially on the aforesaid centerline and an extended position in which said second end is substantially in fore-and-aft alinement with and behind the bale-discharge means; brace means cooperative between the bale tongue and the element for selectively maintaining both positions of the element, said brace means including releasably interconnected parts relatively movable when released to accommodate changes in length of the brace means because of changes in position of the tongue as aforesaid; and means on said second end of the element for selectively connecting a trailer to said second end in both positions of the element.

6. In an agricultural baler adapted to advance over the field on a pair of wheels transversely spaced part at opposite sides of the fore-and-aft centerline of the baler and including bale-discharge means laterally beyond one wheel and a forwardly extending pivoted draft tongue selectively positionable in a transport position with its front end substantially on said centerline or an operating position with its front end forwardly of and substantially in fore-and-aft alinement with the bale-discharge means, the improvement residing in a trailer hitch comprising: a hitch element having first and second opposite ends and means on its first end for attachment to the baler on a pivot behind the wheels and substantially midway between the aforesaid centerline and the bale-discharge means for swinging of said element between a folded position in which its second end is substantially on the aforesaid centerline and an extended position in which said second end is substantially in fore-and-aft alinement with and behind the bale-discharge means; brace means cooperative between the baler tongue and the element for fixing the element in its extended position, said brace means including at its forward end a pivotal connection to the tongue and at its rear end a releasable connection with the element to enable the brace means to swing inwardly with the tongue when the tongue is moved from its operating position to its transport position; means releasably cooperative between the baler and the element for retaining the element in its folded position; and means on said second end of the element for selectively connecting a trailer to said second end in both positions of the element.

7. The invention defined in claim 6, in which: the trailer connecting means includes a portion cooperative with the rear end of the brace means to support said rear end when the element is in its folded position.

References Cited in the file of this patent

UNITED STATES PATENTS

| | | |
|---|---|---|
| 1,442,247 | Brown et al. | Jan. 16, 1923 |
| 2,175,427 | Carmody et al. | Oct. 10, 1939 |
| 2,265,061 | Coultas et al. | Dec. 2, 1941 |
| 2,430,007 | Evans | Nov. 4, 1947 |
| 2,512,097 | Goodspeed | June 20, 1950 |
| 2,516,646 | Reiter et al. | July 25, 1950 |
| 2,524,669 | Knoblauch | Oct. 3, 1950 |
| 2,634,675 | Heinje | Apr. 14, 1953 |
| 2,658,770 | Koenig | Nov. 10, 1953 |

FOREIGN PATENTS

| | | |
|---|---|---|
| 571,819 | Great Britain | Sept. 11, 1945 |